United States Patent
Basak et al.

(10) Patent No.: US 6,765,039 B1
(45) Date of Patent: Jul. 20, 2004

(54) WATER FAST, WATER-BASED PIGMENTED INK-JET INK

(75) Inventors: Arup K. Basak, North Potomac, MD (US); Henry M. Dante, Midlothian, VA (US)

(73) Assignee: Philip Morris Incorporated, New York, NY (US)

( * ) Notice: Subject to any disclaimer, the term of this patent is extended or adjusted under 35 U.S.C. 154(b) by 0 days.

(21) Appl. No.: 09/551,051

(22) Filed: Apr. 18, 2000

(51) Int. Cl.$^7$ .................... C09D 11/10; C08L 33/02; C08L 33/08
(52) U.S. Cl. .................... 523/160; 524/522; 524/523; 524/556
(58) Field of Search .................... 523/160, 161; 106/31.6, 31.65, 31.85; 524/556, 522, 523, 548

(56) References Cited

U.S. PATENT DOCUMENTS

| | | | | |
|---|---|---|---|---|
| 5,017,644 A | * | 5/1991 | Fuller et al. | 524/612 |
| 5,085,698 A | * | 2/1992 | Ma et al. | 524/388 |
| 5,106,417 A | * | 4/1992 | Hasuer et al. | 524/104 |
| 5,221,334 A | | 6/1993 | Ma et al. | |
| 5,324,349 A | * | 6/1994 | Sano et al. | 106/31.25 |
| 5,531,818 A | * | 7/1996 | Lin et al. | 106/31.28 |
| 5,658,376 A | * | 8/1997 | Noguchi et al. | 106/31.43 |
| 5,693,127 A | * | 12/1997 | Nigam et al. | 524/188 |
| 5,709,737 A | * | 1/1998 | Malhotra et al. | 106/31.43 |
| 5,736,606 A | * | 4/1998 | Yanagi et al. | 524/547 |
| 5,852,074 A | * | 12/1998 | Tsutsumi et al. | 523/161 |
| 5,883,157 A | | 3/1999 | Yamashita | |
| 5,889,083 A | * | 3/1999 | Zhu | 523/161 |
| 5,913,971 A | * | 6/1999 | Fujimatsu et al. | 106/31.86 |
| 5,980,623 A | * | 11/1999 | Hiraoka et al. | 106/31.49 |
| 5,997,136 A | * | 12/1999 | Fujisawa et al. | 347/101 |
| 6,005,023 A | * | 12/1999 | Anton et al. | 523/161 |
| 6,039,796 A | * | 3/2000 | Kubota et al. | 106/31.6 |
| 6,232,370 B1 | * | 5/2001 | Kubota et al. | 523/161 |
| 6,378,999 B1 | * | 4/2002 | Doi et al. | 347/100 |
| 6,455,628 B1 | * | 9/2002 | Ma et al. | 524/505 |
| 6,488,751 B1 | * | 12/2002 | Takemoto | 106/31.13 |

* cited by examiner

*Primary Examiner*—Callie Shosho
(74) *Attorney, Agent, or Firm*—Connolly Bove Lodge & Hutz LLP

(57) ABSTRACT

An ink composition suitable for use in ink-jet printers comprising an ethanol-water vehicle, a dispersant resin solublized by ammonium hydroxide, pigment, a translucent acrylate emulsion, and a defoamer has been developed. The ink is stable in storage, water fast after printing, scratch resistant with high gloss, has a neutral pH, has a low viscosity and is enviornmentally friendly.

6 Claims, No Drawings

US 6,765,039 B1

WATER FAST, WATER-BASED PIGMENTED INK-JET INK

BACKGROUND OF THE INVENTION

Inks for use in ink-jet printers require properties such as, for example, smear resistance, quick drying, scratch resistance and the ability to pass through an ink-jet nozzle without clogging. Preferably, the ink uses solvents that does not pose safety or environmental hazards. Accordingly, water-based inks are in particular demand. Some attempts to formulate water-based inks that satisfy the requirements of an ink-jet ink can be found in the patent literature.

U.S. Pat. No. 5,889,083 discloses an ink comprising about 40–80% water, about 0.1–10% colorant that may include carbon black, about 1–40% water-soluble or water-dispersible binder resin having a molecular weight of about 1500 to about 50000 and about 20–500 acid number as exemplified by acrylic copolymer and styrene-maleic anhydride resins, about 0.03–30% wax that can be emulsified, suspended or dispersed in water, about 0.1–10% organic solvents to increase the dispersibility of the resin or the colorant, about 0.01–5% defoamer and ammonium hydroxide to neutralize the resin and as a conductivity or pH adjusting agent.

U.S. Pat. No. 5,883,157 discloses an ink comprising water, a coloring material, a water-soluble organic solvent, about 0.01 to 5% of a 1000 to 10000 molecular weight copolymer containing sufficient carboxylic groups to provide a acid value of 50 to 700 and 0.001 to 5% of a surface active agent, wherein the foaming surface viscosity of the ink is 0.05 to 1.0 g/s.

U.S. Pat. No. 5,221,334 discloses an ink comprising an aqueous carrier, preferably having a polyhydric alcohol component, a pigment stabilized by an AB or BAB block copolymer, wherein A is a hydrophobic acrylate or methyacrylate ester, amide or nitrile, and B is a hydrophilic acrylate or methacrylate acid, ester or amide neutralized by KOH or dimethylethanolamine and a surfactant.

In the prior art discussed above, the solvents used, such as polyalcohols or sulfur and/or nitrogen containing solvents, may pose safety or environmental hazards. It would be desirable to achieve optimal ink-jet ink properties with an environmentally friendlier solvent system.

SUMMARY OF THE INVENTION

An ink composition suitable for use in ink-jet printers comprising an ethanol-water vehicle, a dispersant resin solublized by ammonium hydroxide, a translucent acrylate emulsion or a hyperdispersant, a pigment and a defoamer has been developed. The ink is stable in storage, water fast after printing, scratch resistant with high gloss, has a neutral pH, and has a low viscosity.

DETAILED DESCRIPTION

An ink composition suitable for ink-jet printers has been developed that is stable in storage, water-fast after printing, scratch resistant with high gloss, has a neutral pH, has a low viscosity and is friendly to the environment. The ink comprises an ethanol-water vehicle, a dispersant resin solublized by ammonium hydroxide, a translucent acrylate emulsion or a hyperdispersant, a pigment and defoamer.

The dispersant resin (hereinafter "dispersant") is a polymer that is generally not soluble in water, but capable of being solublized by aqueous ammonia or ammonium hydroxide. Most commercially available solid acrylic resins that fit the requisite molecular weight, acid number and glass transition (Tg) parameters can function as dispersants. The MW of the dispersant range from about 4600 to about 10,000 daltons, preferably about 6000–7000. The acid number ranges from about 50 to about 300, preferably about 240–270. The Tg is about 85–120° C., preferably about 95–105° C., most preferably about 100° C.

The dispersant comprises about 2–20% of the overall ink, preferably about 5–12%, and more preferably about 8–9%. An example of a dispersant resin is an about 6000 MW styrene acrylic acid block copolymer having about 270 acid number (SCX 686, also known as JONCRYL 686, from S. C. Johnson Polymer).

As used in the ink formulation, the dispersant is solublized in the vehicle by ammonia or ammonium hydroxide solution. The dispersant dissolves in the vehicle when its acids (COOH) react with ammonia or ammonium hydroxide to form ionic salts (COO$^-$NH$^+$). However, not all of the acids in the dispersant need to be neutralized to dissolve the dispersant. At this time, the preferred embodiment has a dispersant that is only partially neutralized to the extent required to dissolve the dispersant in the vehicle. When the ink is applied on to a substrate, or when the ink is heated, the ammonia volatilizes. At that time, the dispersant is no longer soluble in the vehicle and falls out of solution onto the substrate.

The preferred pigment is dry powdered carbon black. Other pigments that work effectively for stable dispersion include surface modified carbon black (i.e. by attaching functional groups such as COOH, SO$_3$H, OH, etc.) Examples of useful pigments include ELFTEX 5/GP-3506, BLACK PEARLS 1000 or REGAL 400r from Cabot Corporation. As a percentage of the overall ink, pigment ranges from about 1–12%, preferably about 5–9%.

The solvent mixture or vehicle of the ink is a mixture of ethanol and water. About 50% ethanol in water is optimum where low odor of ink is suitable for most environments. The ordinary artisan would understand how to increase the ethanol percentage to decrease drying time to favor high speed printers, preferably the ethanol is about 20–80% of the vehicle, more preferably about 40–60%, most preferably 50–55%. The vehicle makes up the percentage of ink that is not taken by the other ingredients, usually about 30–90% of the ink, preferably about 50–60%.

Another component of the ink is a non-film forming translucent acrylic polymer emulsion (hereinafter "translucent acrylate emulsion"). A preferred translucent acrylate emulsion is a 40–50% colloidal dispersion of styrene acrylic polymer, such as SCX 2610 from S. C. Johnson Polymer Incorporated. This component comprises about 2–9%, preferably about 5%, of the ink. This component can be replaced by about 2–5%, preferably about 3–3.5% of hyperdispersant (e.g., SOLSPERSE 27000, an aromatic ethoxylate having an polymeric chain and an anchoring group).

Defoamer comprises about 0.5% to 5% of the ink, preferably about 0.8–1.1%. Examples of antifoaming agents include TEGO FOAMEX 810 (Goldsmith Chemical Co.), DAPRO DF 1161 (Elementis Specialty Chemicals), SUR-FYNOL DF 75 (Air Products Inc.) or mixtures thereof.

Additional ingredients include: about 0.05–10%, preferably about 0.1–2.5% surfactants (e.g., SILWET L77, a polyalkylene oxide modified heptamethyltrisiloxane from Witco Chemicals); about 0.05–1%, preferably about 0.1–0.5%, more preferably about 0.3–0.4% biocides (e.g., NUOSEPT 95, a bicyclic oxazolidine solution from Creanova Inc.); less than about 1.5%, preferably about 1–1.5% additional hyperdispersant when used in conjunction with the translucent acrylate emulsion; and less than about 1–10%, preferably about 1.5–2% humectants (e.g., propylene glycol, glycerol or preferably GRB2, a mixture of aromatic ethoxylate and glycerol from Zeneca Inc.).

The ink according to this invention may be prepared by:
1. dissolving the dispersant in the vehicle by adding aqueous ammonia to form a dispersant solution;
2. adding pigment to the dispersant solution to form a pigment dispersion; and
3. adding an translucent acrylate emulsion and a defoamer to the pigment dispersion.

An alternative method for making ink according to this invention includes:
1. dissolving the dispersant in the vehicle by adding aqueous ammonia to form a dispersant solution;
2. adding pigment and surfactant to the dispersant solution to form a pigment dispersion; and
3. adding a translucent acrylate emulsion, an defoamer and a preservative to the pigment dispersion.

Another alternative method for making ink according to this invention includes:
1. dissolving the dispersant in the vehicle by adding aqueous ammonia to form a dispersant solution;
2. adding a hyperdispersant, a defoamer and a humectant to the dispersant solution to form a hyperdispersant solution;
3. adding a pigment, and a surfactant to the hyperdispersant solution to form a pigment dispersion; and
4. adding a translucent acrylate emulsion, a defoamer and a preservative to the pigment dispersion.

The amount of hyperdispersant millbase needed is optimized from theoretical calculations of pigment surface area. A preferred hyperdispersant, SOLSPERSE 27000, has a pH of about 7.17.

All citations herein are hereby incorporated by reference.

The invention is illustrated by the following non-limiting Examples.

EXAMPLE 1 a) Resin Solution

In a commercial blender (WARING), 86.0 g of dispersant resin (SCX 686 solid polymeric resin from S. C. Johnson Polymer) was mixed with 50 ml of 50% v/v water-ethanol vehicle (ethanol obtained at 95% from Azaper Alcohol & Chemical Co.). As the resin/vehicle solution swirled, 28 ml of 28% ammonium hydroxide solution (28%; J. T. Baker) was added portion-wise. Thereafter, another 100 ml of the 50% vehicle was added and blended at low speed fear about 15 minutes. While the resin is normally not soluble in water, this solution is a transparent, light-yellow solution that forms a water-resistant, fine, shiny coat on paper after drying.

b) Pigment Dispersion

With stirring, 96.0 g of the resin solution prepared in a) was added portion-wise to 46.0 g of pigment (27 nm dry particle size carbon black, ELFTEX 5: GP-3506, from CABOT, Corp.) in a blender to form globules. Thereafter, 50 ml of vehicle was added and blended at high speed for about 25–30 minutes. After the resulting foaming subsides, 0.8 g of defoamer (Surfynol DF 75 from Air Products) and another 120 ml of 50% vehicle was added and stirred at high speed for another 15 minutes.

c) Finished Ink

From b), 168 g of pigment dispersion was mixed with 84 g of SCX 2610 translucent acrylate emulsion. To this mixture, 300 ml of 50% vehicle was added and stirred well to obtain a homogeneous pigmented ink. In order to prevent foaming during the jetting process, 2.13 g of antifoamer (TEGO Foamex 810 from Goldschmidt Chemical, Hopewell, Va.) followed by an additional 300 ml of 50% vehicle was added and blended for about 10 minutes. For ease of dispersion, one may add vehicle in portions during the formulation process, rather just at the very end of a particular step.

EXAMPLE 2 a) Resin Solution

The resin solution was prepared by the process in Example 1.

b) Pigment Dispersion

With slow stirring, 36.1 g of pigment (16 nm dry particle size carbon black, BLACK PEARLS 1000 Cabot GP-3383) was suspended in 25 ml of the 50% water-ethanol vehicle. Thereafter, 75.5 g of the resin solution prepared in a) was added, followed by 50 ml 50% vehicle, and then 50 ml water. The mixture was stirred a slow speed for about 10 minutes. Then, to this stirred dispersion, 0.63 g of Surfynol DF 75 in 45.3 ml of water was added, followed by another 140 ml 50% vehicle and blended at high speed for 15 minutes. After adding another 50 ml water, the suspension is stirred for another 3 minutes.

c) Finished Ink

From b), 206 g of pigment dispersion was mixed with 80 ml of water and 106.39 g of SCX 2610 and mixed as thoroughly as possible. Then, to this mixture, an additional 200 ml of water was added and blended at high speed for about 10 minutes. A solution of 2.36 g of TEGO Foamex 810 in 3 ml of the 95% ethanol is added, followed by 60 ml of water, and 50 ml of 50% vehicle, and stirred in the blender for about 10 minutes.

COMPARISON EXAMPLE 3 a) Resin Solution 87.891 g of SCX 686 was treated with 100 ml of 40% v/v propylene glycol-water vehicle and 20 ml of 30% ammonium hydroxide solution and stirred well. The dissolution is completed by adding another 20 ml of ammonium hydroxide solution followed by 60 ml of the 40% vehicle, and blending another 20 minutes.

b) Pigment Dispersion 45.55 g of BLACK PEARLS 1000 was dispersed in a blender at high speed with 400 ml of the resin solution from a), followed by 100 ml water. Thereafter, another 100 ml of water was added, followed by 0.4 g surfactant (SILWET L77 from Witco Chemicals), followed by another 30 ml water, and blended at high speed for about 5 minutes. 0.44 g of TEGOD Foamex 810 was added with an additional 30 ml of 40% vehicle and 30 ml of water. The resulting suspension was dispersed in a blender for about 20 minutes with another 200 ml water.

c) Finished Ink

From b), 800 ml of pigment dispersion was treated with 75 ml of the 40% vehicle, followed by 26.14 g of SCX 2610, followed by another 0.59 g of TEGO Foamex 810 in 10 ml water. The mixture was thoroughly mixed by blending at high speed. 2.57 g of preservative (NUOSEPT 95 from CREANOVA (formerly HULS America)) in 30 ml water was added and dispersed in a high speed blender.

EXAMPLE 4 a) Resin Solution

The resin solution was prepared by the process in Example 1.

b) Hyperdispersant Solution 100 ml of pigment hyperdispersant (SOLSPERSE 27000 from Zeneca, Inc.) was mixed with 190 ml of 50% ethanol/water vehicle. Then, 0.47 g defoamer (about 0.2% DAPRO DF 1161 from Elementis Specialties) was added with stirring, followed by 3.7 g humectant (about 5% GRB2 from Zeneca Inc.). The mixture was blended well, then mixed with 85 ml of the resin solution in a), followed by an additional 1.72 g DAPRO DF 1161 in 10 ml water. The solution was thoroughly blended at high speed for about 5–10 minute. The mixture is then transferred in a liter beaker and stirred by a magnetic stirrer.

c) Pigment Dispersion 11.195 g of BLACK PEARLS 1000 was dispersed portion-wise in the hyperdispersant solution from step b) with normal stirring. When addition of the carbon black is complete, the solution was blended thoroughly in a laboratory blender with an additional 40 ml of the 50% vehicle. 2.914 g of about 0.2% SILWET L77 was added, and blended for about an hour at room temperature.

d) Finished Ink

From c), 500 ml of pigment dispersion and 50 ml of water were blended with 20 g of SCX 2610 in 20 ml water. The resulting mixture was blended with a solution of 1.0 g of TEGO Foamex 810 in 10 ml of water and 20 ml ethanol. The mixture was thoroughly mixed by blending at high speed. After complete mixing, 3.57 g of NUOSEPT 95 in 80 ml 50% vehicle was added and blended.

COMPARISON EXAMPLE 5 a) Resin Solution 43 g of SCX 686 was pulverized in a grinder into powder form and taken into 100 ml of 50% ethanol-water vehicle. With stirring, 20 ml of 28% ammonium hydroxide was added, followed by 30 ml dimethylethanolamine. To avoid foaming, stir intermittently at high speed in a blender. After dissolution of all solids, the mixture is diluted with 120 ml water.

b) Hyperdispersant Solution 50 ml of SOLSPERSE 27000 was mixed with 200 ml of 50% ethanol/water vehicle. After thorough mixing, 0.47 to 0.5 g of DAPRO DF 1161 was added, followed by additional 25 ml 50% vehicle, and 3.7 to 4 g 5% GRB2. With washing, the volume was about 295 ml.

c) Pigment Dispersion

In a blender, 100 ml of the resin solution from a) was added to the hyperdispersant solution from b) and stirred well for about 15 minutes. Then, 11.96 g of pigment (REGAL 400R carbon black from Cabot Corp.) is added in stages under normal stirring. When the addition was complete, the solution was transferred to a high speed blender. With the 50% vehicle wash of the prior container, the total volume becomes about 500 ml.

d) Finished Ink

From c), 500 ml of pigment dispersion and 50 ml of water were blended with 20 g of SCX 2610 in 20 ml water. The resulting mixture was blended with a solution of 2.2 g of TEGO Foamex 810 in 70 ml of 50% vehicle. After complete mixing, 3.97 g of NUOSEPT 95 in 50 ml 50% vehicle was added and blended. An additional 310 ml 50% vehicle was stirred in.

Physical Property

The examples were tested.

The pH ranged from about 7.2 to about 7.85.

The viscosity ranged from about 2.5 to about 2.8 centipoise (cp). At ambient temperatures water has a 1.0 cp, while commercial black inks generally has a viscosity much higher than 3 cp.

The conductivety of the ink ranged from about 2800–9800 $\mu$S/cm (micro-Siemens), preferably about 5500–6000 $\mu$S/cm.

The particle of the ink ranged from about 128–450 nm, preferably about 280–300 nm, and showing an increase of about 10–15 nm from the dry pigment particles.

The ink-jet ink according to the invention has an equilibrium surface tension of about 25–42 mN/m, preferably about 36 mN/m (milliNewton per meter is equivalent to dynes/cm).

The shelf-life of the inks was tested by storage for over six month. Even after the long storage time, no agglomeration or precipitation of pigment particles were observed.

The print quality was tested by printing the inks on normal bond paper. The ink dried immediately without trailing. Under running tap water, the print was water fast. Using standard ASTM procedures, the print was scratch resistant.

We claim:

1. An ink having a conductivity from about 5500–6000 $\mu$S/cm, a particle size of about 280–300 nm, which is an increase of about 10–15 nm from the dry pigment particles and an equilibrium surface tension of about 36 mN/m, wherein the ink comprises about 1–12% pigment and about 8–9% dispersant resin solublized by ammonium hydroxide.

2. The ink according to claim 1 comprising about 30–90% water-ethanol vehicle.

3. The ink according to claim 1 comprising about 5–9% pigment and water-ethanol vehicle.

4. The ink according to claim 3, wherein the dispersant resin is a styrene acryate copolymer, the pigment is carbon black powder, the pH is about 7.2–7.85, the viscosity is about 2.5–2.8 cp, and further comprising 2–9% translucent acrylate emulsion containing about 40–50% polymer, and an optional ingredient selected from surfactant, biocide, hyperdispersant or humectant.

5. A method of printing comprising the steps of (a) applying to a substrate an ink-jet ink comprising ethanol-water vehicle and about 2–20% dispersant resin solublized by ammonium hydroxide, about 2–9% translucent acrylate emulsion or about 2–5% hyperdispersant, about 1–12% pigment and about 0.5–5% defoamer; and (b) volatilizing the ammonia to fix the ink to the substrate, and wherein the ink has a conductivity from about 5550–6000 $\mu$S/cm, a particle size of about 280–300 nm, which is an increase of about 10–15 nm from the dry pigment particles and an equilibrium surface tension of about 36 mN/m.

6. The method according to claim 5, wherein the ink comprises ethanol-water vehicle and about 8–9% dispersant resin solublized by ammonium hydroxide, and about 5% translucent acrylate emulsion or about 3–3.5% hyperdispersnt, about 5–9% pigment and about 0.8–1.1% defoamer.

* * * * *

UNITED STATES PATENT AND TRADEMARK OFFICE
CERTIFICATE OF CORRECTION

PATENT NO. : 6,765,039 B1
DATED : July 20, 2004
INVENTOR(S) : Arup K. Basak et al.

It is certified that error appears in the above-identified patent and that said Letters Patent is hereby corrected as shown below:

Column 6,
Line 43, "cp" should read -- cP --.

Signed and Sealed this

Twenty-third Day of November, 2004

JON W. DUDAS
*Director of the United States Patent and Trademark Office*